Aug. 27, 1935.    R. M. WILMOTTE    2,012,412
METHOD OF AND APPARATUS FOR LOCATING A POINT IN SPACE
Filed June 26, 1930    2 Sheets-Sheet 1
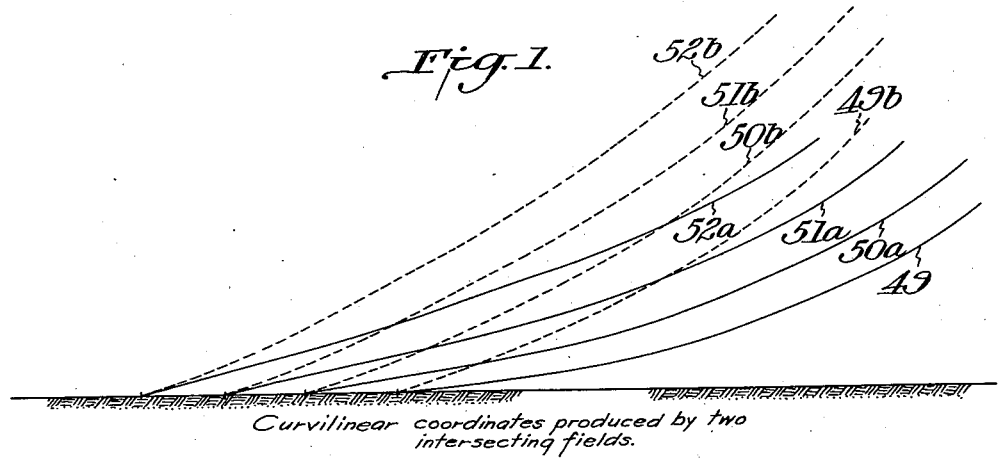
Curvilinear coordinates produced by two intersecting fields.
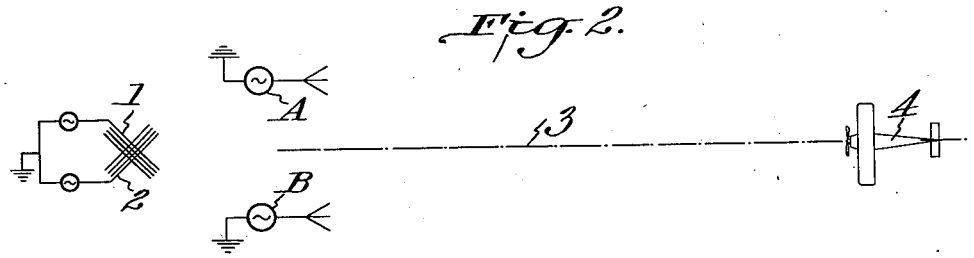
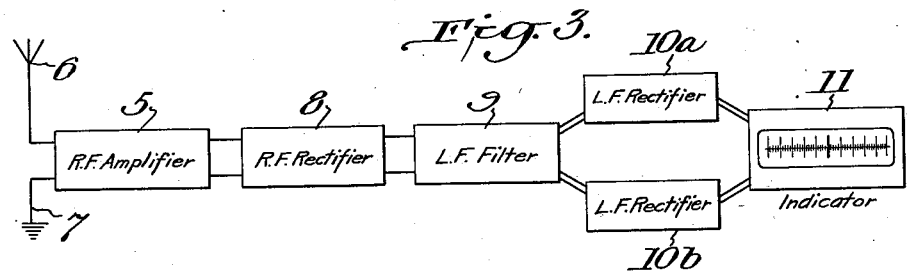
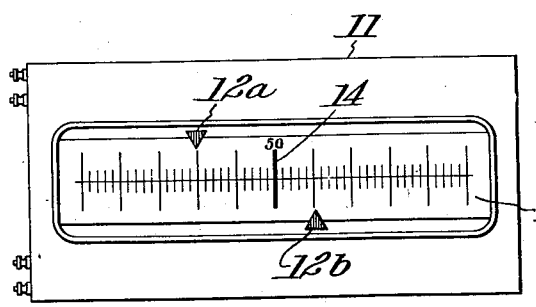
Inventor
Raymond M. Wilmotte
By Byrnes Townsend & Potter
his Attorneys

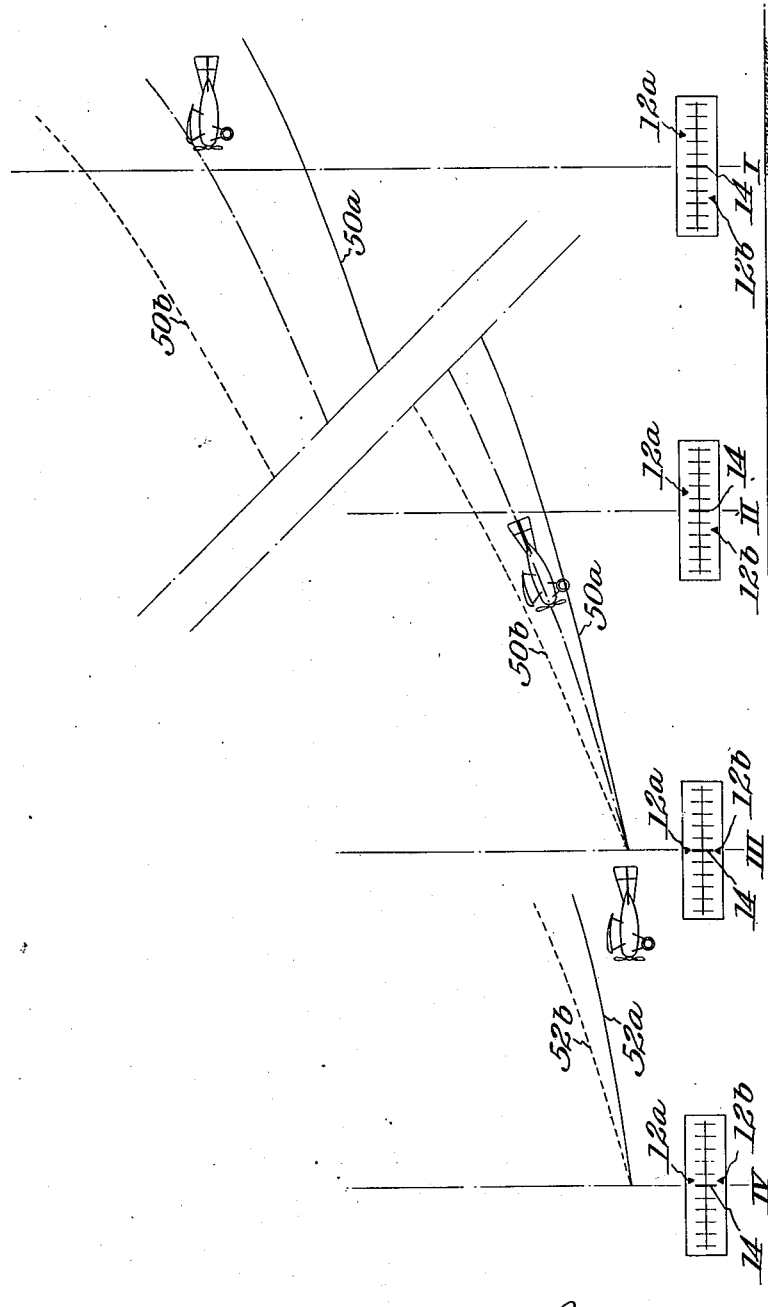

Patented Aug. 27, 1935

UNITED STATES PATENT OFFICE 2,012,412

METHOD OF AND APPARATUS FOR LOCATING A POINT IN SPACE

Raymond M. Wilmotte, Boonton, N. J., assignor, by mesne assignments, to Radio Corporation of America, New York, N. Y., a corporation of Delaware Application June 26, 1930, Serial No. 464,056

17 Claims. (Cl. 250—11)

This invention relates to methods of and apparatus for determining the location of a point in space and more particularly to methods of and apparatus for determining the location of aircraft.

Systems of the "radio beacon" type for guiding aircraft along a line in a horizontal plane are well known, and it has been proposed to establish an electrical field in space adjacent a landing field for guiding aircraft to the ground. According to this system, waves are emitted from a directional radiator at or adjacent the landing field and the aircraft is provided with a receiver which includes an instrument for measuring the intensity of the electrical field at the aircraft. By holding the aircraft on a horizontal course until the receiver instrument indicates a predetermined field strength, and then constraining the aircraft to follow such a course that the instrument reading remains constant at the predetermined value, the aircraft will approach the ground along a sloping line which represents the location, in space, of equal potential or field strength. The radio beacon or other appropriate means may be employed at the same time for indicating the vertical plane in which the aircraft should travel.

This system of guiding aircraft to ground is open to the serious objection that it does not afford any indication of the altitude of the aircraft. When landing in a fog or at night without flood illumination, the pilot has no means for determining his relative position upon the equipotential line which he is travelling.

Objects of the present invention are to provide methods of and apparatus to afford a three-dimensional determination of a point in space. Further objects are to provide a method of and apparatus for guiding aircraft or submarine craft along a definite line in space, and for indicating their position upon that line. More particularly, objects are to provide methods of and apparatus for establishing in space an intersecting pattern between two systems of electrical waves, one system of equipotential lines thus established providing an indication for guiding aircraft to the ground and the second system of equipotential lines affording an indication of the distance between the aircraft and the ground.

These and other objects of the invention will be apparent from the following specification when taken with the accompanying drawings in which:

Fig. 1 is a diagrammatic view illustrating the location, on a vertical plane, of the intersecting patterns formed in space by two systems of electrical waves;

Fig. 2 is a diagrammatic plan view of a landing field equipped in accordance with the invention;

Fig. 3 is a diagrammatic view of the equipment carried by the aircraft;

Fig. 4 is a front elevation of one form of indicating device forming a part of such equipment; and Fig. 5 is a diagrammatic view, similar to Fig. 1, but on a larger scale, illustrating one method of guiding aircraft to ground.

As indicated in the plan view, Fig. 2, the landing field may be provided with some form of radio beacon equipment 1, 2, for establishing a vertical plane, indicated by the broken line 3 of Fig. 2, along which the aircraft such as an aeroplane 4 may be guided to the landing field.

In accordance with the present invention, two directional radiators A, B are located at opposite sides of the radio beacon plane 3 for emitting carrier waves of the same radio frequency but modulated at different low or audio frequencies.

As indicated by the diagram, Fig. 1, the electrical waves emitted from the sources A and B establish an intersecting pattern in space as the two fields are not coincident. In Fig. 1, the solid lines represent the locus, in the vertical plane 3, of points of several different potentials as established by the source A, and the series of dotted lines indicate similar equipotential lines established by the source B.

For convenience of description, the equipotential lines from source A are identified by reference numerals 49a to 52a, it being assumed that the field strength from source A along line 50a, for example, is such that the indicating instrument on the aeroplane will read "50" when the aeroplane is at any point along the equipotential line 50a. The equipotential lines from source B are similarly indicated as 49b to 52b, inclusive, and it is to be noted that, at any given point on the ground, the field strength from the two sources is substantially equal.

It will be apparent that the two intersecting fields provide a system of curvilinear coordinates which affords an absolute determination of a point in the vertical plane 3 when the respective field strengths at that point are known. Assuming that the aircraft is provided with appropriate equipment for measuring the intensity of the field strengths of sources A and B, the pilot can plot his altitude above the ground and his horizontal distance from sources A and B.

As it would doubtless be inconvenient if not impossible for a pilot to plot his course on a chart such as represented by Fig. 1, apparatus of the type shown in Figs. 3 and 4 may be employed to afford a continuous indication from which the pilot may judge his position with respect to the landing field. As indicated diagrammatically in Fig. 3, the receiving and indicating equipment includes a radio frequency amplifier 5 that is connected across a suitable antenna structure 6 and ground 7 on the airplane and which works into a radio frequency rectifier 8. The output from the rectifier includes both of the modulation frequencies employed at sources A and B, respectively, and these low frequency signals are passed to the filter 9 where they are separated into two channels, one feeding the source A modulation to the low frequency rectifier 10a and the other feeding the source B modulation to the low frequency rectifier 10b. The rectified outputs from the low frequency rectifiers pass to separate windings of a measuring instrument 11 to actuate pointers 12a, 12b, respectively, that move over a single scale 13. The amplifier and the measuring instrument are preferably so designed that the reading at the central portion of the scale corresponds to the field strength at an equipotential line, for example, line 50a or 50b, along which the airplane is to be guided to the ground. The measuring instrument 11 is preferably provided with a fiducial mark 14 which extends across the path of travel of both pointers at a scale reading corresponding to the predetermined field intensity which the pilot is to employ in landing the airplane.

The position in space of any given equipotential line may be maintained substantially fixed by appropriate control of the sources A and B. The airplane may, if desired, be provided with an oscillator for checking or adjusting the performance of the receiving equipment as the airplane approaches the landing field.

As indicated above, the observed readings of the two field intensities may be plotted on curvilinear coordinates to determine the location of the craft, and such a method may be quite feasible in the case of submarine vessels or dirigible aircraft. In general, however, such plotting of the course of the craft is unnecessary as the pilot may estimate his position with sufficient accuracy when a double pointer measuring instrument is employed.

The radio beacon will determined the vertical plane in which the craft travels as it approaches the landing field. The position of craft in that vertical plane is determined by the field strengths at the craft, and the pilot constrains the craft to travel along such a path that the field strength readings indicated by pointers 12a and 12b vary in a predetermined fashion. When the equipotential lines from sources A and B are related as shown in Fig. 1, the pilot may conveniently follow an equipotential line, such as line 50a as he approaches the landing field. In using this system, the pilot will hold an approximately horizontal course, in the radio beacon plane 3, until the pointer 12a is opposite the fiducial mark 14 which coincides with the "50" mark on the scale 13. Since the two fields are non-coincident, the position of pointer 12b at the instant that pointer 12a is opposite the fiducial mark 14, will afford an indication of the altitude of the aircraft, for example, an aeroplane, when it reaches the equipotential line 50a. The greater the difference between the two field strengths, as indicated by the number of scale divisions between pointer 12b and the fiducial mark 14, the greater the altitude of the aeroplane. The pointer 12b approaches the fiducial mark 14 as the aeroplane travels along the equipotential line 50a, and at a predetermined position a pointer 12b (pointer 12a being continuously at the "50" scale division), the pilot knows that he has reached that altitude at which the aeroplane should be "flattened out" for landing.

According to another method, which is illustrated diagrammatically in Fig. 5, the pilot may hold the plane on an approximately horizontal course until the pointers 12a and 12b lie at opposite sides of the fiducial mark 14; i. e., until the plane is in the area defined by the equipotential lines 50a and 50b. Successive positions of the aeroplane in space and diagrammatic illustrations of the instrument readings are shown at the transverse planes indicated by broken lines I, II and III. At line I, the plane is midway between equipotential lines 50a and 50b, as indicated by the fact that the pointers 12a and 12b are equidistant from the fiducial mark 14 which corresponds to a field strength of 50. At this point, the plane is directed downwardly and, if the theoretical path is accurately followed, the pointers 12a and 12b will move towards mark 14 at the same rate, i. e., the positive and negative increments by which they are spaced from fiducial mark 14 will remain equal to each other as they decrease in magnitude. At the transverse plane indicated by line III, the equipotential lines 50a and 50b meet in space at that altitude above the landing field at which the aeroplane should flatten out or level off for landing. The pilot is advised of his arrival at this altitude by the fact that the pointers 12a and 12b both coincide with the fiducial mark at this point on the predetermined travel path. The sources A and B are, of course, so adjusted that this intersection of the "50" potential lines lies not only at the desired altitude but at such horizontal distance from the intended landing point that the latter may be reached in normal flight if the plane is leveled off as it passes this intersection.

There will necessarily be some permissible latitude in the use of this system as there must be in all systems involving the skill of an operator and sensitive apparatus which may vary somewhat in its operation. If, for example, the pilot has failed to guide the aeroplane along such a path that the field strengths or instrument pointers coincide at the transverse plane III, but realizes this condition at a subsequent position, i. e., transverse plane IV corresponding to equal field strength of "52" magnitude, he may then level off for landing if the landing field is of such size that the horizontal distance between planes III and IV may be neglected. Similarly, if the amplification of the receiving apparatus falls below the standard value which would bring the pointers to the fiducial mark as the aeroplane reaches plane III, the only error introduced is in the indication of horizontal position and not in altitude. Landing fields are usually of relatively large area and therefore the pilot may safely land in the intended manner even through the sensitivity of the receiver has so decreased that the aeroplane reaches the leveling off altitude at transverse plane IV and not, as the instrument indicates, at plane III.

In the above description, it has been assumed that the aeroplane is carefully guided along the theoretical or predetermined path which will give rise to accurately predetermined variations in the instrument readings. The path actually taken by the aeroplane will usually be only an approximation of the theoretical path, but with sensitive measuring instruments, the pilot can reduce the meanderings from the intended path to small and non-important magnitudes. Although flying conditions may be so bad that it is impossible to hold the aeroplane closely to the intended path, the readings given by instrument 11 will advise the pilot of his position in space. With this exact knowledge of his path of travel and position, the pilot may find it expedient to circle the field and make a second attempt to land if he is unable to follow his intended course on his first attempt. Furthermore, the pilot will endeavor to follow such variation from the normal landing path as may be indicated by particular weather conditions at the landing field or by the particular aeroplane. The above examples are therefore to be understood as illustrative of the methods which may be employed in guiding aircraft to the ground when the position of the aircraft is known to the pilot.

For simplicity of explanation, it has been assumed that the two field strengths are equal or approximately equal at that point in space at which the aeroplane should level off. This equality of the field strengths is by no means essential so long as the pilot is aware of those predetermined variations in the instrument readings which correspond to the intended path of travel. As it is inconvenient to note the readings of pointers on two separate instruments, or at two separated portions of a single scale, it will usually be desirable to design the receiving equipment to bring the pointers 12a and 12b into coincidence or approximate coincidence for the respective field strengths existing at the critical altitude above ground level. This may be readily done in the case of unequal field strengths by employing instrument movements of different sensitivity, or by selectively amplifying the energy from the separate sources. The field strengths may be so related that, as the aircraft travels along an equipotential line of one field, the observed changing values of the other field strength are proportional to altitude. Or, if desired, the fields may be so related that the change in strength of the second field is greater at low altitudes than at high altitudes.

The two sources may derive power from a single or from separate oscillators when the radiated waves are of the same radio frequency but modulated at different low frequency. If desired, the signals may be of different radio frequencies modulated at the same or different low frequencies, or unmodulated; the receiving equipment being appropriately designed to measure the respective field strengths.

It is therefore apparent that the choice of the intersecting pattern as well as the design of the indicating instruments affords such latitude that, as the aircraft or submarine vessel is moved along a path giving rise to a predetermined variation (which may be zero) in the measured value of one field strength, the changing readings of the measured value of the second field may follow any desired predetermined law with respect to altitude or depth.

I claim:

1. The method of guiding aircraft to ground at a landing field, which comprises establishing from the ground two non-coincident electric fields which form an intersecting pattern in the space through which the aircraft should pass in approaching the landing field and in landing, measuring at the aircraft the intensity of each of said fields, and constraining the aircraft to move along a path which gives rise to predetermined variations in the measured magnitudes of the intensity of each of said fields.

2. The method as set forth in the next preceding claim, wherein the aircraft is constrained to travel upon an approximately horizontal path until the respective measured field strengths differ from a predetermined value by increments of equal magnitude but opposite sign, and then moving the aircraft along a path which simultaneously decreases the magnitude of said increments at the same rate, whereby the plane travels along a predetermined line in space, and determining the position of the aircraft on that line by comparison of the magnitude of the said increments with a predetermined standard.

3. The method as set forth in claim 1, wherein the aircraft is moved along an approximately horizontal path until the measured magnitude of one field reaches a predetermined value, then moving the aircraft along a path which maintains constant the measured value of said one field and causes the measured value of the second field to approach that predetermined value, and determining the position of the aircraft upon its path of flight by comparison of the difference between said measured field strengths with a predetermined standard.

4. The method of determining the location of aircraft in space, which comprises establishing from the ground two electric fields which form an intersecting pattern in the space where the aircraft is located, measuring at the aircraft the strength of the respective electric fields, and referring the observed measurements of the respective field strengths to a system of curvilinear coordinates which represent the location on a vertical plane of lines of equipotential of the respective fields.

5. The method of facilitating the landing of aircraft, which comprises establishing from the ground two electric fields which form an intersecting pattern in the space where the aircraft is located, measuring at the aircraft the strength of the respective electric fields, constraining the aircraft to move along a path which gives rise to a predetermined variation in the measured magnitude of the strength of one field, whereby the aircraft travels along a line predetermined in space, and determining the position of the aircraft upon said predetermined line in space by comparison of the measured magnitude of the strength of the second field with a predetermined standard.

6. In guiding air craft to ground at a landing field, the method which comprises radiating radio beacon signals consisting of two systems of electrical signals which determine a vertical plane of equal signal strength along which the plane may approach the landing field, establishing an intersecting pattern by propagating two sets of electrical waves in the space through which aircraft may be guided by said radio beacon signals, measuring at the aircraft the field strength of each of said sets of electrical waves, and determining the position of the aircraft in the equal signal strength plane of said radio beacon signals by plotting the measured field strengths on a system of curvilinear coordinates representing the location in said vertical plane of lines of equipotential strength of the respective fields established by said electrical waves.

7. The method as set forth in the next preceding claim, wherein said sets of electrical waves are radiated from sources symmetrically arranged with respect to said vertical plane.

8. The method of determining the location of an aircraft which comprises, establishing an electrical field which marks out a path to be followed by said aircraft, producing two electrical fields which form an intersecting pattern in the space adjacent said path, moving the aircraft along said path to produce predetermined variations in the observed magnitude of the intensity of one field at the aircraft, and comparing the changing value of the intensity of the other field with a predetermined standard to determine the distance along which the aircraft has travelled along the field.

9. The method of guiding aircraft to ground at a predetermined point on a landing field which comprises, establishing an electrical field which marks out a path running through the landing point on said field, producing two noncoincident electrical fields of like frequency which are directive and form an intersecting pattern in the space through which the aircraft should pass in following said path toward or from the landing point on said field, measuring at the aircraft the intensity of each of said fields separately, and causing the aircraft to move along a path which gives rise to predetermined variations in measuring magnitudes of the intensity of each of said fields.

10. In apparatus for facilitating the landing of aircraft, the combination with a radio transmission beacon system located adjacent the landing field, said beacon having directional transmission means for establishing a vertical plane along which the aircraft may be guided as it approaches the landing field, two directional radiating antennas located adjacent said landing field and at opposite sides of said radio beacon, said radiating system having means for radiating carrier waves forming an intersecting pattern into space, and indicating means on said aircraft for indicating the strength of said intersecting pattern, said indicating means comprising energy absorbing means, a radio frequency amplifier, a radio frequency rectifier, a low frequency filter and a lower frequency rectifier for rectifying the energy from both of said radiating antennas, an indicating meter having two indices to indicate the location of said aircraft with respect to each of said radiating antennas.

11. Apparatus as set forth in claim 10, wherein the radiating antennas located adjacent the landing field, comprise antennas which are substantially symmetrical about a vertical axis.

12. In apparatus for facilitating the landing of aircraft, the combination of a single radiating means for establishing a vertical plane along which the aircraft may be guided as it approaches the landing field, said single radiating means being located adjacent the landing field, two directional radiating antennas located at each side of said single radiating means for establishing an intersecting pattern in space, and indicating means on said aircraft for indicating the strength of said intersecting pattern, said indicating means comprising energy absorbing means, a radio frequency amplifier, a radio frequency rectifier, a low frequency filter and a low frequency rectifier for each of said radiating antennas, an indicating meter having two indices to indicate the location of aircraft within said intersecting pattern.

13. In apparatus for facilitating the landing of aircraft, the combination with a radio beacon located on a landing field for establishing a vertical plane for guiding said aircraft to said landing field, two directional radiating antennas located at equal and opposite sides of said radio beacon for emitting carrier waves of the same radio frequency but modulated at different audio frequencies, forming an intersecting pattern in space wherein the aircraft travels, indicating means located on said aircraft, said indicating means comprising energy absorbing means, a radio frequency amplifier, a radio frequency rectifier, a low frequency filter and a low frequency rectifier for rectifying the energies of each of said antennas, an indicating meter to indicate the location of said aircraft with respect to said radiating antennas.

14. In apparatus for facilitating the landing of aircraft at a landing field, said apparatus comprising a directional beacon to establish a vertical plane for guiding said aircraft, said beacon having two fixed crossed loops, each loop energized by separate generators, two directive radiating antennas located at equal and opposite sides of said radio beacon for emitting carrier waves of the same radio frequency but modulated at different audio frequencies, forming an intersecting pattern in space wherein the aircraft travels, indicating means located on said aircraft, said indicating means comprising energy absorbing means, a radio frequency amplifier, a radio frequency rectifier, a low frequency filter and a low frequency rectifier for rectifying the energies of each of said antennas, an indicating meter to indicate the location of said aircraft with respect to said radiating antennas.

15. In apparatus for facilitating the landing of aircraft, the combination with a radio transmission beacon system located at the landing field, said beacon having directional transmission means for establishing a vertical plane along which the aircraft may be guided as it approaches the landing field, two directional radiating antennas located at or adjacent said landing field and at opposite sides of said radio beacon, said radiating system having means for radiating carrier waves forming an intersecting pattern into space, and indicating means on said aircraft for indicating the strength of said intersecting pattern, said indicating means comprising energy absorbing means, a radio frequency amplifier, a radio frequency rectifier, a low frequency filter and a low frequency rectifier for rectifying the energy from both of said radiating antennas, an indicating meter having two indices to indicate the location of said aircraft with respect to each of said radiating antennas.

16. Apparatus as set forth in claim 15, wherein the radiating antennas located at the landing field, comprise antennas which are substantially symmetrical about a vertical axis.

17. In apparatus for facilitating the landing of aircraft, the combination of a single radiating means for establishing a vertical plane along which the aircraft may be guided as it approaches the landing field, said single radiating means being located at the landing field, two directional radiating antennas located at each side of said single radiating means for establishing an intersecting pattern in space, and indicating means on said aircraft for indicating the strength of said intersecting pattern, said indicating means comprising energy absorbing means, a radio frequency amplifier, a radio frequency rectifier, a low frequency filter and a low frequency rectifier for each of said radiating antennas, an indicating meter having two indices to indicate the location of aircraft within said intersecting pattern.

RAYMOND M. WILMOTTE.